United States Patent [19]

Kastl et al.

[11] Patent Number: 4,623,566

[45] Date of Patent: Nov. 18, 1986

[54] FILM OF FIBER-REINFORCED REGENERATED CELLULOSE PROVIDED WITH A GAS-IMPERMEABLE LAYER, FOR THE PRODUCTION OF TUBULAR CASINGS

[75] Inventors: Erna Kastl, Taunusstein; Ludwig Klenk, Oestrich-Winkel; Horst Faust, Wiesbaden; Karl Stenger, Rüdesheim, all of Fed. Rep. of Germany

[73] Assignee: Hoechst Aktiengesellschaft, Frankfurt am Main, Fed. Rep. of Germany

[21] Appl. No.: 677,097

[22] Filed: Nov. 30, 1984

[30] Foreign Application Priority Data

Dec. 2, 1983 [DE] Fed. Rep. of Germany ........ 3343635

[51] Int. Cl.$^4$ .......... F16L 11/00; A22C 13/00
[52] U.S. Cl. .................... 428/36; 428/508; 428/536; 138/118.1; 426/105; 426/135; 427/324; 427/379; 427/407.1
[58] Field of Search .......... 428/36, 527, 536, 508; 138/118.1, 156, 170; 426/105, 135; 427/324, 230, 379, 407.1

[56] References Cited

U.S. PATENT DOCUMENTS

| | | | |
|---|---|---|---|
| 2,096,221 | 10/1937 | Atkinson | 99/176 |
| 2,207,793 | 7/1940 | Freeman | 99/176 |
| 2,819,488 | 1/1958 | Gimble | 17/42 |
| 2,999,788 | 9/1961 | Morgan | 162/146 |
| 3,594,857 | 7/1971 | Michl | 17/42 |
| 3,619,854 | 11/1971 | Ilgen | 17/42 |
| 3,766,603 | 10/1973 | Urbutis et al. | 17/42 |
| 3,988,804 | 11/1976 | Regner et al. | 17/45 |
| 4,116,162 | 9/1978 | Dinter et al. | 118/104 |
| 4,287,217 | 9/1981 | Hammer et al. | 138/118.1 |
| 4,356,200 | 10/1982 | Hammer et al. | 426/105 |
| 4,396,039 | 8/1983 | Klenk et al. | 138/118.1 |
| 4,401,135 | 8/1983 | Andra et al. | 138/118.1 |
| 4,401,136 | 8/1983 | Porrmann et al. | 138/118.1 |
| 4,478,670 | 10/1984 | Heyse et al. | 156/380.1 |
| 4,546,023 | 10/1985 | Kastl et al. | 138/118.1 |
| 4,562,101 | 12/1985 | Andrae et al. | 428/36 |

Primary Examiner—John Kittle
Assistant Examiner—James J. Seidleck
Attorney, Agent, or Firm—Schwartz, Jeffery, Schwaab, Mack, Blumenthal & Evans

[57] ABSTRACT

Disclosed is a film of fiber-reinforced regenerated cellulose having on one surface thereof a gas-impermeable layer and on the other surface thereof a gas-permeable layer, the gas-permeable layer comprising a plurality of linear discontinuities running parallel to one another, distributed across the surface of the layer. Preferably, both the gas-permeable layer and the gas-impermeable layer comprise a vinylidene group-containing copolymer. Also disclosed is a process for producing the film and a seamed tubular casing, preferably a sausage casing, made from the film.

18 Claims, No Drawings

FILM OF FIBER-REINFORCED REGENERATED CELLULOSE PROVIDED WITH A GAS-IMPERMEABLE LAYER, FOR THE PRODUCTION OF TUBULAR CASINGS

BACKGROUND OF THE INVENTION

The present invention relates to a film of fiber-reinforced regenerated cellulose which is impermeable to gas, a process for producing the film, and a tubular casing, preferably a sausage casing, produced from the film and which has a sealed seam running along the longitudinal axis of the casing.

U.S. Pat. No. 4,401,136 discloses a tubular casing, in particular, a sausage casing, produced from a film of the present type. The film web is shaped into a tubing and the edge regions, which are brought close to each other, are joined by means of a film strip by sealing the film strip against the gas-impermeable sealable surface layer of the film web. Due to its oxygen-, water-, and water vapor-impermeable layer this tubular casing can, for example, be employed as a sausage casing for emulsion-type and cooked sausages.

However, it has been found that problems arise when a longitudinal seam is formed by sealing the edge regions with a film strip. In cases where an overlapped seam is formed from the known film material, the seam obtained is relatively weak and tends to tear.

There has also been described in German Offenlegungsschrift No. 29 35 080, a tubular casing which, in addition to a gas-impermeable internal coating of a vinylidene chloride copolymer, possesses a gas-permeable external coating of a vinylidene chloride copolymer. This tubular casing is seamless, so that the basic problems to be solved by the present invention do not arise. The external, gas-permeable coating is applied in order to improve the shock resistance of the known casing when it is used as a sausage casing, and to prevent tearing of the sausage casing when the sausage is cut.

Such seamless tubings of fiber-reinforced regenerated cellulose are produced by a completely different process than the seamed casings to which the present invention is directed. In the preparation of a seamless casing, a non-woven fiber web is shaped into a tubing having overlapping edges which are glued with viscose. After single- or double-sided coating of the tubular-shaped non-woven fiber web with viscose by means of annular slot dies, the tubing is coagulated, regenerated into cellulose hydrate gel, and dried. During this process the tubing is internally supported by the gas mixture which forms during coagulation and regeneration and by an enclosed volume of air which is introduced during drying. In an optional step, the tubing is stretched in the longitudinal and transverse directions to improve its mechanical properties.

A disadvantage of the above process is that the laid-flat gel tubing exhibits weakened zones, which are referred to as extrusion edges, in the area of the edges running along the longitudinal axis of the laid-flat tubing. The stretching process also presents disadvantages. Neither the internal pressure exerted by the process gases, nor the internal pressure during drying can be controlled very precisely, so that it is impossible to keep the diameter of the tubings constant within narrow limits. A further disadvantage is that, in the case of stretching by means of expanding gases, there is a fixed ratio of the stretching forces acting in the tangential and radial directions. Accordingly, the mechanical properties of the seamless tubing, and, in particular, the shrink properties and strength values in the longitudinal and transverse directions, are fixed, as well.

The internal coating comprised of, for example, a material which is impermeable to water and water vapor, which is necessary if the tubing is to be used as a sausage casing for cooked and emulsion-type sausages, is applied to the inside of the seamless tubing in the form of a solution or dispersion. This requires a technically complicated process which is susceptible to disturbances. For example, the solvent or dispersing agent must diffuse through the tubing wall to the outside surface of the tubing in a lengthy process stage. Furthermore, it is difficult to control the film formation on the inside wall of the tubing. Finally, the mechanical properties, adjustment of which has been accomplished in a complicated process during the production of the tubing, are often impaired by the coating process. Since the tubings have to be laid flat immediately after coating, there exists the danger of damaging or weakening the water vapor-tight coating in the area of the squeezing edges. Due to these coating faults, the packed foodstuffs spoil or take on an unattractive appearance, as a result of water loss or undesired access of oxygen.

In order to avoid these disadvantages of seamless tubings of fiber-reinforced regenerated cellulose, the present invention is concerned with tubings having a sealed seam, which are produced from a flat film web, more along the lines of the tubings discussed in U.S. Pat. No. 4,401,136.

SUMMARY OF THE INVENTION

It is therefore an object of the present invention to provide a film of fiber-reinforced regenerated cellulose which is impermeable to gas, i.e., a film with a barrier layer to oxygen, water and water vapor, which can be converted into a tubular seamed casing which evidences an increased strength.

It is another object of the invention to provide a process for producing the film described above, which can be performed at low technical expense.

Yet another object of the present invention is to provide a tubular casing with a sealed seam of high strength, which is capable of withstanding the stresses occurring during its further processing, in particular during stuffing with the foodstuffs to be packaged.

Still another object of the present invention is the provision of a film of the type described above in which the properties of the film are adjustable during processing.

Therefore, in accomplishing the objects of the present invention, there has been provided according to one aspect of the present invention, a film of fiber-reinforced regenerated cellulose suitable for the production of tubular casings, in particular, sausage casings, which have a sealed seam extending along the longitudinal axis of the casing, comprising a support material comprising fiber-reinforced cellulose, a substantially gas-impermeable layer comprising a sealable thermoplastic resin applied to one surface of the support material, and a gas-permeable layer comprising a sealable thermoplastic resin and a plurality of discontinuities distributed across the surface thereof applied to the other surface of the support material.

Preferably, the sealable thermoplastic resin of the gas-impermeable and/or the gas-impermeable layer comprises a vinylidene group-containing copolymer, and most preferably, the same resin is used for both the gas-impermeable and the gas-impermeable layer.

In accordance with another aspect of the present invention, there has been provided a tubular casing, in particular, a seamed sausage casing, made from a film of the type described above.

In accordance with yet another aspect of the present invention, there has been provided a process for producing a film which includes a fiber-reinforced regenerated cellulose support material having on one surface thereof a gas-impermeable layer comprising a sealable thermoplastic resin and on the other surface a gas-permeable layer comprising a sealable theroplastic resin and having, distributed across the surface thereof, a plurality of discontinuities, comprising the steps of coating a support material of a fiber web with viscose, coagulating the viscose while preventing shrinkage of the fiber web, regenerating the coagulated viscose to produce cellulose hydrate gel, washing the cellulose hydrate gel support material, drying the support material to produce a fiber-reinforced regenerated cellulose having a water content of equal to or less than 15% by weight, relative to the total weight of the film, while concurrently stretching the film in the transverse direction, subsequent to the washing step and prior to the drying step, predrying the fiber-reinforced support material to partially dehydrate the support material to a water content between about 130 and 200% by weight, relative to the weight of the fiber-reinforced support material of cellulose hydrate gel, wherein the support material is allowed to shrink in the transverse direction during the predrying step, subsequent to the predrying step, coating one surface of the support material with a high concentration aqueous dispersion comprising a sealable thermoplastic resin, and prior to, simultaneously with or subsequent to the high concentration aqueous dispersion coating step or immediately prior to the predrying step, coating the other surface of the support material with a low concentration aqueous dispersion comprising a sealable thermoplastic resin to form a gas-impermeable layer. Preferably, the high concentration aqueous dispersion comprises a solids content of at least about 45% by weight, and after drying, a gas-permeable layer comprising a plurality of discontinuities is formed from said high concentration aqueous dispersion.

In a preferred embodiment, the quantity of water absorbed from the dispersions by the support material is controlled by varying the solids content of the dispersions and/or the time for contacting the dispersions with the support material, and wherein the quantity of water absorbed by the support material from the high-concentration dispersion is less than the quantity of water released from the support material during the predrying step and the quantity of water absorbed from the low concentration dispersion is greater than the quantity of water released from the support material during said predrying step.

Further objects, features, and advantages of the present invention will become more apparent from a review of the detailed description of preferred embodiments which follows.

DETAILED DESCRIPTION OF PREFERRED EMBODIMENTS

In attempting to accomplish the objects of the present invention using a known film having an uninterrupted gas-impermeable resin coating on one of its surfaces, a difficulty arises in that, if the film build-up is changed, the advantageous properties exhibited up to that point by the known film may be adversely affected. If, for example, the film is used for producing a sausage casing, it must be possible to adjust its properties such that, e.g., after stuffing with sausage meat and simmering or cooking, the casing shrinks considerably, so that it tightly adjoins the sausage meat, or that, on the other hand, the sausage casing does not show any shrinkage at all after simmering or cooking. In the first case, no new change of the film can occur, which might lead to the formation of gaps between the sausage meat and the casing and, as a consequence, to the deposition of fat in these gaps. Moreover, the absolute impermeability of the barrier layer to gases, such as water vapor and atmospheric oxygen, must not be impaired.

Coatings which have a permeability to water vapor of less than about 10 $g/m^2.d$ (DIN 53,122) can be referred to as essentially impermeable to gas for the purposes of the present invention. In particular, in those cases where the resin comprising the layer if a vinylidene group-containing copolymer, values of not more than about 0.5 $g/m^2.d$ to 2 $g/m^2.d$ can be achieved. This coating is completely free from discontinuities and is therefore called a "resistive layer" or a "barrier layer."

The coating having discontinuities is permeable to gases, in particular to water vapor, but this permeability is lower than that of the completely uncoated film of fiber-reinforced regenerated cellulose. The permeability of this coating is greater than about 200 $g/m^2.d$, preferably from about 300 to 700 $g/m^2.d$, in particular from about 350 to 500 $g/m^2.d$ (DIN 53,122). In the text which follows, this layer will be referred to as an "interrupted" or "permeable" layer.

The two layers cover the entire area of the two surfaces of the film.

Films and tubular casings produced from the films having a sealed seam and a gas-impermeable surface coating of a thermoplastic sealable resin, in particular a vinylidene group-containing copolymer, which optionally is anchored to the film surface by an adhesion-promoting resin layer, and the production thereof, are known. Materials suitable for the gas-impermeable coating are, for example, described in U.S. Pat. No. 4,401,136, the disclosure of which is herein incorporated by reference; see, particularly, column 9, line 57, to column 10, line 36. The barrier layer material known from this publication is also used in the present case.

Adhesion promoters, with respect to surface coatings, are to be understood as known substances or mixtures of substances which are applied to the film surfaces prior to applying the coatings, in order to achieve an improved adhesion between the film surfaces and the coatings. If necessary, an adhesion promoter is used in the present case to anchor the permeable surface layer and/or the barrier layer to the film surfaces in a wet-resistant manner. It is especially employed in the cases where a particularly high mechanical strength of the sealed seam is to be achieved. The adhesion promoter is located between the surface coatings and the film surface. Preferably, the adhesion promoter is a water-insoluble, cured, cationic resin. Polyurethane resins, nitrocellulose and other compounds known as water-insoluble anchoring agents can also be used.

Although, in principle, the adhesion-promoting layer of the resin would only have to be present in those regions of the surfaces of the film web, which are to be glued, it is expedient for industrial reasons to provide the entire area of both surfaces of the film with one or two different adhesion-promoting layers of resin.

In the manufacture of the fiber-reinforced film of cellulose hydrate, the dispersion containing the adhesion promoter is coated onto the regenerated, but not yet dried, web of cellulose hydrate gel. This coating can be effected prior to, simultaneously with or subsequent to the treatment of the gel web with a plasticizer, such as a polyol. For this purpose, the fiber-reinforced film of cellulose hydrate gel is coated, prior to the application of the polymers forming the surface layers, with an aqueous solution containing up to 25% by weight of a dispersible adhesion promoter, in particular, a thermosetting cationic resin.

In the course of the subsequent drying stages, the resin is cured to its water-insoluble form and is permanently bonded to the film surface.

The layer of adhesion-promoting resin has a weight per unit area of about 30 to 300 mg/m$^2$, preferably of about 40 to 75 mg/m$^2$.

Examples of suitable cationic thermosetting resins and of suitable solvents and possible additives are given in the already mentioned U.S. Pat. No. 4,401,136.

Particularly preferred cationic thermosetting resins are condensation products of polyamide-polyamine or aliphatic polyamines or of polyamides with bifunctional halohydrins or derivatives thereof, which are also described in detail as suitable materials for the anchoring layer in U.S. Pat. No. 4,401,136.

After the application of the dispersion of adhesion promoter, the water content of the film of cellulose hydrate gel is reduced to about 130 to 200% by weight, relative to the weight of the cellulose. During this partial dehydration, the cationic resin is partly precured by the action of heat.

The additional surface coating on the second surface of the film or tubular casing, respectively, which, in contrast to the coating on the first film surface, is permeable to gas, is essential for solving the problem addressed by the present invention and described at the outset. The terms "first" and "second" surface are by no means meant to indicate any order, but are only used to distinguish the two surfaces of the film or tubular casing from each other.

The permeable surface coating comprises a heat-sealable material, i.e., a material the sealing properties of which are thermally activated. The set, solvent-free, permeable surface coating should not be tacky, but should melt only during sealing as a result of the heat supplied and should solidify again upon cooling.

The raw materials used for the coating on the second surface are copolymers of vinyl chloride or of vinylidene chloride, optionally with an addition of other resins and other polymers. Copolymers of vinyl acetate and polymethacrylates, polyurethanes and polyesters, in particular, ethylene/vinyl acetate copolymers, vinyl acetate/vinyl chloride copolymers, polyamides and polyethylene can likewise be used.

The sealable thermoplastic material employed, in particular, is a vinylidene copolymer which usually is present in a weight per unit area of about 3 to 15 g/m$^2$. By the process of this invention, a special, water-vapor and smoke-permeable structure is imparted to the continuous coatings formed by these resins, which generally are impermeable to water vapor and smoke. Suitable resins are obtained by copolymerization of monomers, whereby at least one component contains a vinylidene group.

The polymers used for the gas-permeable coating can be the same as materials which are suitable for the gas-impermeable coating, which are described in U.S. Pat. No. 4,401,136, and particularly, column 9, line 57 to column 10, line 36 thereof. The second surface of the film is provided with a coating of this thermoplastic resin, which practically extends over the entire width of the film and presents an discontinuous structure. As compared to the total surface area, the discontinuities cover only a relatively small portion of the film surface, so that more than about 60%, in particular, more than about 85%, of the second surface is covered by the surface coating, in order to achieve a sufficiently strong sealed seam.

In accordance with this invention, the coating on the second surface is provided with linear discontinuities, the size of which is in the micrometer range. The discontinuities extend substantially parallel to one another in the machine direction, i.e., in the longitudinal direction of the film which is produced as a web. These discontinuities are distributed over the entire second surface of the film. The preferred dimensions of the linear discontinuities include a length of about 5 to 1000 μm, in particular, of about 15 to 500 μm; a width of about 2 to 15 μm, in particular, of about 5 to 12 μm; and a depth of about 3 to 15 μm, in particular, of about 5 to 10 μm. The mutual distance between the relatively long discontinuities, i.e., discontinuities having lengths of more than about 300 μm, is about 40 μm to 80 μm, the average distance values being about 60 μm.

The depth of the discontinuities is equal to the thickness of the surface coating, so that, in the area of the discontinuities, the cellulose is substantially bared. The width of the discontinuities is virtually constant over the entire length and width of the discontinuities. The length of the discontinuities in particular varies in a range of 15 to 500 μm.

The lengths and widths of the discontinuities are measured by means of a scanning microscope, with 300-fold magnification. The depths of the discontinuities are determined by inspecting the cross-section of the film, with 2000-fold magnification.

The support material itself of the film is fiber-reinforced cellulose (transparent cellulose film, regenerated cellulose, cellulose huydrate), which has been produced as a fiber-reinforced cellulose web by the viscose process as described in U.S. Pat. No. 4,401,136.

The fiber-reinforcement is preferably in the form of a web, for example, a paper web, and usually comprises fibers such as are used in the manufacture of paper or rice paper, or natural fibers, such as hemp fibers or flax fibers, or synthetic fibers, such as polyamide fibers, polyester fibers or polyacrylonitrile fibers.

The fiber web is preferably treated on both sides with a viscose solution, preferably by immersion in a viscose solution or coating with a viscose solution, for example, using slot dies, rollers or spraying devices. The viscose-treated web is then converted into regenerated cellulose.

It is also possible to incorporate into the viscose from about 10 to 80% by weight of reinforcing fibers, which preferably have an average fiber length of about 0.05 to 15 mm. The fibers comprise synthetic organic fibers, natural fibers, for example cotton fibers, or fibrids. The fiber-containing viscose is then extruded through a die into the coagulation bath, whereupon a gel web is formed.

The viscose solution is an alkaline solution of sodium cellulose-xanthate and is usually prepared by reacting the alkali cellulose, which has been obtained from cellulose and sodium hydroxide solution, with carbon disulfide in an alkaline medium. In most cases it contains about 4 to 20% by weight of cellulose. After ripening, the viscose is applied to the fiber web and spun, i.e., coagulated. The coagulation bath contains, for example, about 20 to 80 g/l of sulfuric acid, and furthermore, about 80 to 150 g/l of sodium sulfate and/or about 150 to 300 g/l of ammonium sulfate.

In further stages the fiber-reinforced web-like product comprising coagulated viscose is regenerated to cellulose hydrate gel in an acid medium, for example, in dilute (less than or equal to about 5% by weight) sulfuric acis. The cellulose hydrate gel is then washed with water to remove acid and salts, desulfurized, for example with sodium sulfite solution, optionally passed through a bleaching bath, and finally passed through a softening bath containing, for example, an aqueous 5 to 30% strength glycerol solution.

The final conversion of the fiber-reinforced film of cellulose hydrate gel into regenerated cellulose is achieved by intense drying at about 90° C. to 160° C. In an optional step the water content of the cellulose can be adjusted, by conditioning, to a water content of about 5 to 15% by weight, based on the total weight of the film. Prior to the final conversion, the fiber-reinforced film of cellulose hydrate gel is, after an optional treatment with a liquid containing adhesion promoter, partially dehydrated, and one surface of the film is coated with the mixture forming the continuous barrier layer, whereas the other surface is coated with the mixture forming the gas-permeable layer. The order of the coatings following the partial dehydration is optional. It is also possible to perform the two coating steps simultaneously. It is also possible to apply the substance forming the continuous barrier layer immediately before the partial dehydration. In a preferred process variant, the order of the application of the coatings corresponds to the order followed in the Example described below, i.e., the gas-permeable layer is applied first. After the final drying stage, the fiber-reinforced film has a thickness of about 50 to 200 μm, which corresponds to a weight per unit area of about 50 to 250 g/m$^2$, and its moisture content usually is less than about 15% by weight, in particular between about 5 and 10% by weight, relative to the total weight of the film. The two surface layers have a coating thickness of about 5 to 50 μm, preferably of about 5 to 25 μm, and in particular, about 5 to 15 μm.

An especially advantageous film is obtained when, as described in U.S. Pat. No. 4,401,136, the fiber web is held by the edges, so that shrinking of the web is prevented, in particular during the coagulation of the viscose, but optionally also during the coating with viscose, during the regeneration, during the coating with an adhesion-promoter and/or during the coating with a sealable material.

In accordance with the preferred process variant of the present invention, which includes the partial dehydration step, it is essential that, immediately before the application of the substances forming the two layers to the fiber-reinforced film web of regenerated, but not yet dried cellulose, i.e., cellulose hydrate gel, the water content of the film web, which is relatively high and usually amounts to about 240 to 300% by weight, relative to the weight of the cellulose, be reduced to values of about 130 to 200% by weight, in particular about 140 to 180% by weight. During this intermediate stage, referred to as partial dehydration, the film web is allowed to shrink in the direction perpendicular to the machine direction, by not holding the film web by its edges during this pre-drying stage. The heat required to perform the partial dehydration is supplied to the film web by known means, for example, hot air or radiators.

It is another essential characteristic of the process described above that the solution used to subsequently coat the partially dehydrated, fiber-reinforced film web of cellulose hydrate gel to form the permeable layer comprises a high-concentration aqueous dispersion. The dispersion should have a solids content of at least about 45% by weight, preferably about 45 to 65% by weight, and in particular about 50 to 60% by weight, whereas the substance forming the barrier layer is applied in the form of a low-concentration aqueous dispersion, which has, for example, a solids content of about 10 to 35% by weight, and is of the type known for the production of gas-impermeable surface coatings. It is particularly expedient if, during these coating procedures, the amount of water absorbed by the partially dehydrated film of cellulose hydrate gel from the high-concentration dispersion is smaller than the amount of water removed during the preceding partial dehydration.

On the other hand, the amount of water absorbed by the film from the low-concentration dispersion should be as high as possible. In those cases where the dispersion is applied after the predrying step, the absorbed amount of water advantageously exceeds the amount of water released during the predrying stage. The amount of water which is to be absorbed by the film is controlled by an appropriate adjustment of the solids content of the dispersion and/or of its time of action upon the film.

In another essential process step, the web of cellulose hydrate gel, which has shrunk during the partial dehydration performed prior to the coating with the aqueous dispersions forming the surface layers, is additionally preferably by about 3 to 12%, relative to the original width of the fiber web, in the course of the final drying process, whereby the slight shrinkage which occurs in the transverse direction during the partial dehydration, is at least overcome. Immediately before the stretching step during the final drying process, i.e., after coating the film with the material forming the permeable layer, another predrying step is optionally performed, during which the major amount of water is removed, until the gel web has a water content of about 80 to 150%, by weight. This process step is also described in U.S. Pat. No. 4,401,136.

The strength values of the film in the longitudinal and transverse directions, which are achieved due to the shrinkage-preventing measures and the transverse stretching during the drying process are essential for the production of a tubular casing with a glued seam. The values which can be achieved with respect to tensile strength and elongation at break are described in U.S. Pat. No. 4,401,136, whereby these values may be smaller in the transverse direction than in the longitudinal direction of the film web.

Single-sided coating of the film web with the suitable dispersion is, for example, performed by means of a wire bar. Any other metering coating device which is suitable for the continuous coating of moving webs and permits a short contact time, i.e., 0.1 s to 2 s, between the dispersion stock and the film web can likewise be used. Double-sided coating is, for example, performed by means of a roller coating system or by a combined roller and wire bar coating system. The coating weight varies between about 3 and 15 g/m², in particular about 7 and 11 g/m², for the barrier layer, and between about 5 and 9 g/m² for the permeable surface layer.

It has been shown that relatively wide discontinuities form in the permeable surface layer when, in this intermediate stage, the water content of the cellulose hydrate gel film is reduced to values of less than 130% by weight, whereby the film is allowed to shrink. When values below these minimum values are chosen, the strength of the sealed seam is not considerably reduced, but in that case the film exhibits reduced strength values and insufficient expanding properties, so that it is not suitable for the production of tubular packaging casings, and in particular of sausage casings.

On the other hand, the desired strong bond between the cellulose hydrate film and the surface coatings, in particular the barrier layer, is not obtained if the reduced water content of the film of cellulose hydrate gel is greater than about 200% by weight. With regard to a successful achievement of the objects of the present invention, the shrinkage of the film in the transverse direction during the partial dehydration is also essential, whereby shrinkage can be low and depends on the quantity of water released.

Despite the discontinuities in the layer of thermoplastic material, which are present on the entire second surface of the film, the sealed seam of the film shows excellent strength properties under mechanical or thermal strain. The seam is obtained when the film is shaped into a tubular casing by folding it about its longitudinal axis and sealing the overlapping lateral edges to give a sealed seam, or when a sealable film strip, which has the same composition as the film itself, is inserted in a tubing with a sealed seam running along its longitudinal axis.

Despite the discontinuities and the preferred, discontinuous structure of the permeable layer present on the second surface of the film, the strength of the sealed seam of a tubular casing which is produced from the film in accordance with the present invention and/or which includes a film strip having the film composition, is higher than the mechanical strength of the support material of fiber-reinforced regenerated cellulose. The high strength of the sealed seam is of particular importance in sausage production where, during the cooking of the sausages, the seam is exposed to hot water for a prolonged time. The high strength is also important because during the stuffing, twisting-off, tying and clipping processes, etc., the seam must withstand high mechanical loads and tensions, and dimensional changes may occur.

These advantageous properties make the film particularly suitable for the production of sausage casings for cooked and emulsion-type sausages. Cooked sausages, in particular include, liver sausages and blood sausages. Emulsion-type sausages include, for example, slightly smoked sausages, ham sausages, finely minced pork sausages, yellow-skin sausage and mortadella.

U.S. Pat. No. 4,401,136 describes the formation of a tubular casing from a film in which the casing includes a seam extending along the longitudinal axis of the casing, formed by overlapping and sealing the edge regions of the film or by sealing the edge regions by means of a film strip.

The tubular casing according to the present invention is, for example, produced from the sheet- or web-like, rectangular or endless film by overlapping and joining the edge regions extending in the direction of the longitudinal axis. The casing produced in this way has a sealed overlapped seam which extends in the direction of the longitudinal axis, whereby the outer and inner surface of the film overlap (see FIG. 1 of U.S. Pat. No. 4,401,136).

If the film is used as a sealable film strip, the edge regions of the cellulose film, from which the tubing is formed, are brought into flush contact with each other and the film strip is sealed to the edge regions (see FIG. 3 of U.S. Pat. No. 4,401,135). Quite naturally, the surface layer of the film forming the tubing, which is directed toward the film strip, must be sealable with the film strip. This surface coating preferably comprises a sealable barrier layer representing the inner surface of the tubing.

The surface of the film strip, which is provided with the gas-permeable coating, is sealed to this sealable barrier layer, so that the gas-impermeable coating of the film strip is directed toward the stuffing composition.

The tubular casing having an overlapping seam is likewise produced in a manner such that the barrier layer of the film preferably forms the inner surface of the tubular casing. In this embodiment, the tubular casing has pronounced shrinkage properties when it is used as a sausage casing, and therefore, is capable of very closely adjoining the stuffing composition. The sausage casing tightly surrounds the sausage meat, and thus, imparts an attractive appearance to the sausage. In cases where this shrinkage is undesirable, the shaping of the film into the tubular casing is performed such that the barrier layer of the film forms the outer surface of the tubular casing.

Shaping of the web of film into a tubing is, for example, effected on a sufficiently long path, so that the distortion and formation of folds do not occur, or by deflection over a shoulder-like forming tool (U.S. Pat. No. 4,401,136 and European Patent Application No. 0,080,120). The transport of the web and sealing of the edge zones can be performed cyclically or continuously.

The sealing is performed, for example, by contact with a sealing jaw or a sealing roller which is preheated to a predetermined temperature. Any other heat source may also be used for the sealing, for example, infrared radiators, high-frequency heating or hot air.

Often it is expedient to additionally exert pressure onto the sealing area, for example by means of a heated pressure roller. The applied sealing temperatures and pressures largely depend on the material properties of the layers to be sealed. In practice, preference will be given to those sealable layers which, within a temperature range of about 120° C. to 150° C., will produce sealed seams which are capable of withstanding the stresses occurring during practical use.

For packaging meat products in the form of sausage meat, shirred tubular casings are used, as is known, which progressively unfold as the sausage composition is forced into the casing. These shirred casings have hitherto been manufactured from long tubings which are conveyed in the direction of their longitudinal axis and are shirred against an opposing force, the length of the shirred casing usually being only about 1 to 3% of the original unshirred length.

The tubular casing according to the present invention can also be shirred. Shirring is performed, for example, by means of the apparatus described in U.S. Pat. No. 3,988,804. A shirring ratio of 1:70 to 1:80 can easily be achieved.

A helical twisting of the casing and, consequently, twisting of the relatively thick seam zone about the longitudinal axis of the casing during the shirring process is also possible, but not absolutely required. Twisting is effected, for example, by means of shirring devices which are known per se and are described, for example, in U.S. Pat. No. 2,819,488, 3,619,854, 3,594,857 and 3,766,603, or by means of the process described in European Patent Application No. 0,093,326.

If, for example, the tubular casing is envisaged for sensitive foodstuffs, the film web or the tubular casing is sterilized. For this purpose, customary methods are employed, such as treatment with heat or ozone or high-frequency irradiation.

The flavor of the sausage meat is not affected when the casing is used as a sausage casing. The sausage casing and the sealed seam exhibit high resistance to elongation stresses and volume stability during filling with sausage meat, handling and processing. Surprisingly, the pressure arising during filling and the swelling and shrinking forces arising during cooking and cooling do not cause any damage to the seam, although one of the surface coatings is provided with discontinuities. The sausage casing can also be stored at low temperatures and can be easily cut.

The invention is explained in greater detail by means of the Example which follows.

EXAMPLE

The film is produced substantially along the lines of the process illustrated in FIG. 1 of U.S. Pat. No. 4,401,136. The present process differs from the prior art process in that the process steps which are essential to the present invention, are performed between the baths (8) and the drying section (10). In addition, the coating process shown in FIG. 2 and the predrying stage in the first drying section (10) of FIG. 1 of the prior art process are omitted.

A web of long-fibered hemp paper having a laid-flat width of 235 mm and a weight per unit area of 21 g/m$^2$ is coated on both sides with viscose. For example, the width of the die gap is 0.8 mm, and the web speed is 5 m/min. Then regeneration liquid is applied to the web coated with viscose, for the purpose of precipitation, i.e., coagulation, and regeneration. The web width is kept constant by means of needle chains engaging the two edges of the web, so that shrinkage in the transverse direction, which usually occurs during coagulation and regeneration, is prevented. The fiber-reinforced film web of cellulose hydrate gel is then passed through washing, desulfurization and plasticizing baths. The last bath, through which the film of cellulose hydrate gel is passed, contains a 1% by weight strength aqueous solution of an adhesion promoter which is based on a cationic resin representing a reaction product of adipic acid, diethylene triamine and epichlorohydrin (RESAMIN HW 601, made by Cassella). The film is coated with this solution on both sides. On leaving this bath, the film of cellulose hydrate gel has a width of 210 mm and a water content of 250% by weight.

The partial dehydration of the film web, which follows, is performed after the film web has left the bath (8) and before it enters the drying tunnel (10) shown in the apparatus according to FIG. 1 of U.S. Pat. No. 4,401,136. For this purpose the film web is conveyed over heated rollers having a surface temperature of 70° C. to 80° C. During this step, the film shrinks to a width of 208 mm, and its water content is reduced to 160% by weight. After this intermediate step, the film web is conveyed to a coating appliance, as described in U.S. Pat. No. 4,116,162, where the substance forming the permeable coating is applied. A wire bar of a wire thickness of 150 μm is used as the metering device. The applied coating has a wet film thickness of about 13 to 14 μm.

The coating material employed for the permeable layer is an aqueous polymer dispersion of a carboxyl group-containing copolymer which is composed of a predominant portion of vinylidene chloride units and minor amounts of acrylonitrile units and other polymerizable compounds and has a solids content of 55% (DIOFAN 208 D, made by BASF).

Following this first coating step, the film web, which is now provided with a single-sided coating, is conveyed to a second coating appliance. The second coating apparatus comprises a rotating steel roller, by means of which an aqueous dispersion of the same copolymer, but of a solids content of 30%, is applied from a stock vessel arranged below the film web to the uncoated surface of the cellulose hydrate gel being conveyed above the vessel. By means of a keen air jet blown through a slot die, a so-called air knife, excess dispersion is removed and the coating is equalized.

The predrying stage in the first drying station (10), which is shown in FIG. 1 of U.S. Pat. No. 4,401,136, is omitted. In accordance with the further stages shown in that Figure, the edges of the web, which carries the coatings of the copolymer dispersions, are immediately gripped by needle clip chains (12), and the web is conveyed, in a tenter frame (13), through a number of decks of a drying field (14). When entering the tenter frame, the film is stretched in the transverse direction to a width of 218 mm to 220 mm and retained at this width during the drying of the web, preferably at about 150° C. The resulting film has a residual moisture content of about 7% by weight.

The permeable surface layer has a thickness of about 5 to 7 μm, corresponding to a weight per unit area of about 7 to 8 g/m$^2$. It is not a continuous coating, but possesses a plurality of parallel linear discontinuities which have different lengths of between about 15 and 500 μm, widths of between about 8 and 12 μm and a mean mutual distance of about 60 μm, and which extend in the machine direction. For the distance measurement, only relatively long discontinuities, i.e., discontinuities which are longer than about 300 μm, are considered. The discontinuities extend down to the surface of the cellulose film.

In contrast thereto, the second surface coating is a continuous layer which is substantially impermeable to gas. It has a thickness of about 7 to 9 μm, corresponding to a weight per unit area of about 8 to 10 g/m$^2$.

From the film produced in this way, a tubing with overlapping edges is formed, such as is illustrated, for example, in FIG. 1 of European Patent Application No. 0,080,120. For the process of the instant invention, the contact roller (10) shown in that Figure is designed as a heated sealing roller.

It is also possible to carry out the tube formation and the sausage production in one stage by shaping the film into a tubular casing at the stuffing horn of a stuffing machine and simultaneously forcing sausage meat into the casing.

What is claimed is:

1. A gas impermeable film of fiber-reinforced regenerated cellulose suitable for the production of seamed tubular casings, in particular, sausage casings, comprising:
   a support material comprising fiber-reinforced cellulose;
   a substantially gas-impermeable layer comprising a sealable thermoplastic resin applied to one surface of said support material; and
   a gas-permeable layer comprising a sealable thermoplastic resin and including a plurality of linear discontinuities extending essentially parallel to one another and being distributed across the surface thereof applied to the other surface of said support material wherein said discontinuities have a length of about 5 to 1000 μm, an essentially constant width of about 2–15 μm and a depth equivalent to thickness of the gas-permeable layer.

2. A film as claimed in claim 1, wherein said sealable thermoplastic resin of said gas-impermeable and/or said gas-permeable layer comprises a vinylidene group-containing copolymer.

3. A film as claimed in claim 1, further comprising an adhesion promoting layer provided between said support material and said gas-impermeable layer and/or said gas-permeable layer.

4. A film as claimed in claim 1, wherein said gas-impermeable and said gas-permeable layers comprise the same resin.

5. A film as claimed in claim 7, wherein said discontinuities have a length of about 15 to 500 μm, and a width of about 5 to 12 μm.

6. A film as claimed in claim 1, wherein the weight per unit area of said gas-permeable layer ranges from about 3 to 15 g/m².

7. A film as claimed in claim 6, wherein said weight per unit area ranges from about 5 to 9 g/m².

8. A tubular casing, in particular, a sausage casing, comprising a film as claimed in claim 1 in the shape of a seamed tubing.

9. A tubular casing as claimed in claim 8, wherein the edges of the film overlap and are bonded to one another to form a sealed seam which extends longitudinally along the casing.

10. A tubular casing as claimed in claim 8, wherein the edges of the film overlap one another and further comprising a film strip of the same composition as the film which covers and assists in bonding the edge zones of the film to form a sealed seam which extends longitudinally along the casing.

11. A tubular casing as claimed in claim 8, wherein the edges of the film abut one another and further comprising a film strip of the same composition as the film which covers and bonds the edge zones of the film to form a sealed seam which extends longitudinally along the casing.

12. A gas impermeable process for producing a film, the film including a fiber-reinforced regenerated cellulose support material having, on one surface thereof, a gas-impermeable layer comprising a sealable thermoplastic resin and, on the other surface, a gas-permeable layer comprising a sealable thermoplastic resin which has a plurality of discontinuities distributed across its surface, wherein said discontinuities have a length of about 5 to 1000 μm, an essentially constant width of about 2–15 μm and a depth equivalent to thickness of the gas-permeable layer comprising the steps of:
   coating a support material comprised of a fiber web with viscose;
   coagulating said viscose while preventing shrinkage of said fiber web;
   regenerating said coagulated viscose to produce cellulose hydrate gel;
   washing said cellulose hydrate gel support material;
   drying said support material to produce a fiber-reinforced regenerated cellulose having a water content of equal to or less than 15% by weight, relative to the total weight of the film, while concurrently stretching the film in the transverse direction;
   subsequent to said washing step and prior to said drying step, predrying said fiber-reinforced support material to partially dehydrate said support material to a water content between about 130 and 200% by weight, relative to the weight of said cellulose hydrate gel, wherein said support material is allowed to shrink in the transverse direction during said predrying step;
   subsequent to said predrying step, coating one surface of said support material with a high concentration aqueous dispersion comprising a sealable thermoplastic resin; and
   prior to, simultaneously with or subsequent to said high concentration aqueous dispersion coating step or immediately prior to said predrying step, coating the other surface of said support material with a low concentration aqueous dispersion comprising a sealable thermoplastic resin to form a gas-impermeable layer, wherein said high concentration aqueous dispersion comprises a solids content of at least about 45% by weight, and wherein, after drying, a gas-permeable layer comprising a plurality of discontinuities is formed from said high concentration aqueous dispersion.

13. A process as claimed in claim 12, wherein said predrying step reduces the water content of said cellulose hydrate gel to between about 140 and 180% by weight, relative to the weight of said fiber-reinforced support material.

14. A process as claimed in claim 12, wherein said solids content of said high-concentration dispersion ranges between about 45 to 65% by weight.

15. A process as claimed in claim 14, wherein said solids content of said high-concentration dispersion ranges between about 50 to 60% by weight.

16. A process as claimed in claim 12, wherein the quantity of water absorbed from said high- and low-concentration dispersions by the support material is controlled by varying the solids content of the dispersions and/or the time for reacting said dispersions with said support material, and wherein the quantity of water absorbed by said support material from said high-concentration dispersion is less than the quantity of water released from the support material during said predrying step and the quantity of water absorbed from said low concentration dispersion is greater than the quantity of water released from said support material during said predrying step.

17. A process as claimed in claim 12, comprising the further step of providing at least one surface of said support material with a layer of a liquid comprising an adhesive promoter prior to said predrying step.

18. A process as claimed in claim 16, wherein said support material is initially coated on both surfaces with said low concentration aqueous dispersion to initially provide two gas-impermeable layers, and wherein one of said gas-impermeable layers is subsequently treated to produce said gas-impermeable layer comprising said discontinuities.

* * * * *